(12) United States Patent
Burrow

(10) Patent No.: US 10,352,670 B2
(45) Date of Patent: *Jul. 16, 2019

(54) LIGHTWEIGHT POLYMER AMMUNITION CARTRIDGE CASINGS

(71) Applicant: True Velocity IP Holdings, LLC, Dallas, TX (US)

(72) Inventor: Lonnie Burrow, Carrollton, TX (US)

(73) Assignee: TRUE VELOCITY IP HOLDINGS, LLC, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,961

(22) Filed: Jul. 1, 2014

(65) Prior Publication Data

US 2016/0003589 A1 Jan. 7, 2016
US 2017/0184380 A9 Jun. 29, 2017

Related U.S. Application Data

(60) Continuation-in-part of application No. 14/011,202, filed on Aug. 27, 2013, now Pat. No. 9,546,849,
(Continued)

(51) Int. Cl.
*F42B 5/30* (2006.01)
*F42B 33/00* (2006.01)
(Continued)

(52) U.S. Cl.
CPC .......... *F42B 33/001* (2013.01); *B22F 3/004* (2013.01); *B22F 3/10* (2013.01); *B22F 3/225* (2013.01);
(Continued)

(58) Field of Classification Search
CPC ...... F42B 33/00; F42B 33/0207; F42B 33/02; F42B 33/04; F42B 5/30; F42B 5/307
(Continued)

(56) References Cited

U.S. PATENT DOCUMENTS 99,528 A 2/1870 Boyd
113,634 A 4/1871 Crispin
(Continued)

FOREIGN PATENT DOCUMENTS

CA 2813634 A1 4/2012
DE 16742 1/1882
(Continued)

OTHER PUBLICATIONS

Korean Intellectual Property Office (ISA), International Search Report and Written Opinion for PCT/US2015/038061 dated Sep. 21, 2015, 28 pages.
(Continued)

*Primary Examiner* — Jonathan C Weber
(74) *Attorney, Agent, or Firm* — Chainey P. Singleton

(57) ABSTRACT

One embodiment of the present invention provides a polymeric ammunition cartridge and methods of making and using the same. The cartridge includes a substantially cylindrical insert connected to a substantially cylindrical polymeric middle body. The substantially cylindrical insert includes a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The substantially cylindrical polymeric middle body includes a substantially cylindrical polymeric bullet-end and a substantially cylindrical polymeric coupling end connected by a powder chamber, wherein the substantially cylindrical polymeric coupling end extends over the substantially cylindrical coupling element and covers a circumferential surface of the primer flash hole.

16 Claims, 9 Drawing Sheets

Related U.S. Application Data which is a division of application No. 13/292,843, filed on Nov. 9, 2011, now Pat. No. 8,561,543.

(60) Provisional application No. 61/456,664, filed on Nov. 10, 2010.

(51) Int. Cl.

| | |
|---|---|
| *F42B 33/02* | (2006.01) |
| *F42B 5/307* | (2006.01) |
| *B22F 3/00* | (2006.01) |
| *F42B 5/02* | (2006.01) |
| *C04B 35/64* | (2006.01) |
| *C22C 1/04* | (2006.01) |
| *C22C 14/00* | (2006.01) |
| *C22C 33/02* | (2006.01) |
| *C22C 38/02* | (2006.01) |
| *C22C 38/04* | (2006.01) |
| *C22C 38/18* | (2006.01) |
| *C22C 38/42* | (2006.01) |
| *C22C 38/44* | (2006.01) |
| *C22C 38/48* | (2006.01) |
| *C22C 38/58* | (2006.01) |
| *F42C 19/08* | (2006.01) |
| *B22F 3/22* | (2006.01) |
| *B22F 5/06* | (2006.01) |
| *B22F 3/10* | (2006.01) |
| *B22F 5/00* | (2006.01) |

(52) U.S. Cl.
CPC ............... *B22F 5/00* (2013.01); *B22F 5/06* (2013.01); *C04B 35/64* (2013.01); *C22C 1/0458* (2013.01); *C22C 14/00* (2013.01); *C22C 33/0257* (2013.01); *C22C 33/0285* (2013.01); *C22C 38/02* (2013.01); *C22C 38/04* (2013.01); *C22C 38/18* (2013.01); *C22C 38/42* (2013.01); *C22C 38/44* (2013.01); *C22C 38/48* (2013.01); *C22C 38/58* (2013.01); *F42B 5/02* (2013.01); *F42B 5/025* (2013.01); *F42B 5/30* (2013.01); *F42B 5/307* (2013.01); *F42B 33/00* (2013.01); *F42B 33/02* (2013.01); *F42C 19/083* (2013.01); *F42C 19/0807* (2013.01); *B22F 2998/10* (2013.01)

(58) Field of Classification Search
USPC ............... 102/466, 467, 516, 517, 465
See application file for complete search history.

(56) References Cited

U.S. PATENT DOCUMENTS

| | | | |
|---|---|---|---|
| 130,679 | A | 8/1872 | Whitmore |
| 159,665 | A | 2/1875 | Gauthey |
| 169,807 | A | 11/1875 | Hart |
| 462,611 | A | 11/1891 | Comte de Sparre |
| 498,856 | A | 6/1893 | Overbaugh |
| 640,856 | A | 1/1900 | Bailey |
| 662,137 | A | 11/1900 | Tellerson |
| 676,000 | A | 6/1901 | Hennegerg |
| 865,979 | A | 9/1907 | Bailey |
| 869,046 | A | 10/1907 | Bailey |
| 905,358 | A | 12/1908 | Peters |
| 957,171 | A | 5/1910 | Loeb |
| 963,911 | A | 7/1910 | Loeble |
| 1,060,817 | A | 5/1913 | Clyne |
| 1,940,657 | A * | 12/1933 | Woodford .................. F42B 5/26 102/465 |
| 2,294,822 | A | 9/1942 | Albree |
| 2,465,962 | A | 3/1949 | Allen et al. |
| 2,654,319 | A * | 10/1953 | Roske .................. F42B 5/307 102/467 |
| 2,823,611 | A | 2/1958 | Thayer |
| 2,862,446 | A | 12/1958 | Ringdal |
| 2,918,868 | A | 12/1959 | Lars |
| 3,099,958 | A | 8/1963 | Daubenspeck et al. |
| 3,170,401 | A | 2/1965 | Johnson et al. |
| 3,242,789 | A | 3/1966 | Woodring |
| 3,292,538 | A * | 12/1966 | Umbach .................. F42B 5/067 102/444 |
| 3,485,170 | A | 12/1969 | Scanlon |
| 3,485,173 | A | 12/1969 | Morgan |
| 3,609,904 | A | 10/1971 | Scanlon |
| 3,659,528 | A | 5/1972 | Santala |
| 3,688,699 | A | 9/1972 | Horn et al. |
| 3,690,256 | A | 9/1972 | Schnitzer |
| 3,745,924 | A | 7/1973 | Scanlon |
| 3,749,021 | A | 7/1973 | Burgess |
| 3,756,156 | A | 9/1973 | Schuster |
| 3,765,297 | A | 10/1973 | Skochko et al. |
| 3,768,413 | A | 10/1973 | Ramsay |
| 3,797,396 | A | 3/1974 | Reed |
| 3,842,739 | A | 10/1974 | Scanlon et al. |
| 3,866,536 | A | 2/1975 | Greenberg |
| 3,874,294 | A | 4/1975 | Hale |
| 3,955,506 | A | 5/1976 | Luther et al. |
| 3,977,326 | A | 8/1976 | Anderson et al. |
| 3,990,366 | A | 11/1976 | Scanlon |
| 4,020,763 | A | 5/1977 | Iruretagoyena |
| 4,147,107 | A | 4/1979 | Ringdal |
| 4,157,684 | A | 6/1979 | Clausser |
| 4,173,186 | A | 11/1979 | Dunham |
| 4,187,271 | A | 2/1980 | Rolston et al. |
| 4,228,724 | A | 10/1980 | Leich |
| 4,430,061 | A * | 2/1984 | Webb .................. A61C 7/16 433/9 |
| 4,475,435 | A | 10/1984 | Mantel |
| 4,598,445 | A | 7/1986 | O'Connor |
| 4,614,157 | A | 9/1986 | Grelle et al. |
| 4,679,505 | A | 7/1987 | Reed |
| 4,718,348 | A | 1/1988 | Ferrigno |
| 4,719,859 | A | 1/1988 | Ballreich et al. |
| 4,726,296 | A | 2/1988 | Leshner et al. |
| 4,867,065 | A | 9/1989 | Kaltmann et al. |
| 5,021,206 | A | 6/1991 | Stoops |
| 5,033,386 | A | 7/1991 | Vatsvog |
| 5,063,853 | A | 11/1991 | Bilgeri |
| 5,090,327 | A | 2/1992 | Bilgeri |
| 5,151,555 | A | 9/1992 | Vatsvog |
| 5,165,040 | A | 11/1992 | Andersson et al. |
| 5,237,930 | A | 8/1993 | Belanger et al. |
| 5,247,888 | A | 9/1993 | Conil |
| 5,259,288 | A | 11/1993 | Vatsvog |
| 5,265,540 | A | 11/1993 | Ducros et al. |
| 5,433,148 | A | 7/1995 | Barratault et al. |
| 5,535,495 | A | 7/1996 | Gutowski |
| 5,563,365 | A | 10/1996 | Dineen et al. |
| 5,770,815 | A | 6/1998 | Watson, Jr. |
| 5,798,478 | A | 8/1998 | Beal |
| 5,950,063 | A | 9/1999 | Hens et al. |
| 5,961,200 | A | 10/1999 | Friis |
| 5,969,288 | A | 10/1999 | Baud |
| 6,004,682 | A | 12/1999 | Rackovan et al. |
| 6,048,379 | A | 4/2000 | Bray et al. |
| 6,070,532 | A | 6/2000 | Halverson |
| 6,272,993 | B1 | 8/2001 | Cook et al. |
| 6,283,035 | B1 | 9/2001 | Olson et al. |
| 6,357,357 | B1 | 3/2002 | Glasser |
| 6,375,971 | B1 | 4/2002 | Hansen |
| 6,450,099 | B1 | 9/2002 | Desgland |
| 6,460,464 | B1 | 10/2002 | Attarwala |
| 6,523,476 | B1 | 2/2003 | Riess et al. |
| 6,649,095 | B2 | 11/2003 | Buja |
| 6,708,621 | B1 | 3/2004 | Forichon-Chaumet et al. |
| 6,752,084 | B1 | 6/2004 | Husseini et al. |
| 6,840,149 | B2 | 1/2005 | Beal |
| 6,845,716 | B2 | 1/2005 | Husseini et al. |
| 7,000,547 | B2 | 2/2006 | Amick |
| 7,032,492 | B2 | 4/2006 | Meshirer |

(56) References Cited

U.S. PATENT DOCUMENTS

| | | | |
|---|---|---|---|
| 7,056,091 B2 | 6/2006 | Powers | |
| 7,059,234 B2 | 6/2006 | Husseini | |
| 7,165,496 B2 | 1/2007 | Reynolds | |
| 7,204,191 B2 | 4/2007 | Wiley et al. | |
| 7,213,519 B2 | 5/2007 | Wiley et al. | |
| 7,232,473 B2 | 6/2007 | Elliott | |
| 7,299,750 B2 | 11/2007 | Schikora et al. | |
| 7,353,756 B2 | 4/2008 | Leasure | |
| 7,380,505 B1 | 6/2008 | Shiery | |
| 7,383,776 B2 | 6/2008 | Amick | |
| 7,392,746 B2 | 7/2008 | Hansen | |
| 7,441,504 B2 | 10/2008 | Husseini et al. | |
| 7,543,383 B2 * | 6/2009 | Patel | B22F 3/22 29/890.14 |
| 7,585,166 B2 | 9/2009 | Buja | |
| 7,610,858 B2 | 11/2009 | Chung | |
| 7,750,091 B2 | 7/2010 | Maljkovic et al. | |
| 7,841,279 B2 | 11/2010 | Reynolds et al. | |
| 7,930,977 B2 | 4/2011 | Klein | |
| 8,007,370 B2 | 8/2011 | Hirsch et al. | |
| 8,056,232 B2 * | 11/2011 | Patel | B22F 3/22 164/113 |
| 8,156,870 B2 | 4/2012 | South | |
| 8,201,867 B2 | 6/2012 | Thomeczek | |
| 8,206,522 B2 | 6/2012 | Sandstrom et al. | |
| 8,240,252 B2 | 8/2012 | Maljkovic et al. | |
| 8,408,137 B2 | 4/2013 | Battablia | |
| 8,443,730 B2 | 5/2013 | Padgett | |
| 8,511,233 B2 | 8/2013 | Nilsson | |
| 8,522,684 B2 | 9/2013 | Davies et al. | |
| 8,540,828 B2 | 9/2013 | Busky et al. | |
| 8,561,543 B2 | 10/2013 | Burrow | |
| 8,573,126 B2 | 11/2013 | Klein et al. | |
| 8,641,842 B2 | 2/2014 | Hafner et al. | |
| 8,689,696 B1 | 4/2014 | Seeman et al. | |
| 8,763,535 B2 | 7/2014 | Padgett | |
| 8,790,455 B2 | 7/2014 | Borissov et al. | |
| 8,807,008 B2 | 8/2014 | Padgett et al. | |
| 8,813,650 B2 | 8/2014 | Maljkovic et al. | |
| D715,888 S | 10/2014 | Padgett | |
| 8,857,343 B2 | 10/2014 | Marx | |
| 8,869,702 B2 | 10/2014 | Padgett | |
| 8,875,633 B2 | 11/2014 | Padgett | |
| 8,893,621 B1 | 11/2014 | Escobar | |
| 8,978,559 B2 | 3/2015 | Davies et al. | |
| 9,003,973 B1 | 4/2015 | Padgett | |
| 9,032,855 B1 | 5/2015 | Foren et al. | |
| 9,091,516 B2 | 7/2015 | Davies et al. | |
| 9,103,641 B2 | 8/2015 | Nielson et al. | |
| 9,170,080 B2 | 10/2015 | Poore et al. | |
| 9,182,204 B2 | 11/2015 | Maljkovic et al. | |
| 9,200,880 B1 | 12/2015 | Foren et al. | |
| 9,212,876 B1 | 12/2015 | Kostka et al. | |
| 9,212,879 B2 | 12/2015 | Whitworth | |
| 9,213,175 B2 | 12/2015 | Arnold | |
| 9,254,503 B2 | 2/2016 | Ward | |
| 9,255,775 B1 | 2/2016 | Rubin | |
| 9,329,004 B2 | 5/2016 | Pace | |
| 9,335,137 B2 | 5/2016 | Maljkovic et al. | |
| 9,337,278 B1 | 5/2016 | Gu et al. | |
| 9,347,457 B2 | 5/2016 | Ahrens et al. | |
| 9,366,512 B2 | 6/2016 | Burczynski et al. | |
| 9,389,052 B2 | 7/2016 | Conroy et al. | |
| 9,395,165 B2 | 7/2016 | Maljkovic et al. | |
| D764,624 S | 8/2016 | Masinelli | |
| D765,214 S | 8/2016 | Padgett | |
| 9,429,407 B2 | 8/2016 | Burrow | |
| 9,441,930 B2 | 9/2016 | Burrow | |
| 9,453,714 B2 | 9/2016 | Bosarge et al. | |
| 9,528,799 B2 | 12/2016 | Maljkovic | |
| D778,391 S | 2/2017 | Burrow | |
| D778,393 S | 2/2017 | Burrow | |
| D778,394 S | 2/2017 | Burrow | |
| D778,395 S | 2/2017 | Burrow | |
| D779,024 S | 2/2017 | Burrow | |
| 2001/0013299 A1 | 8/2001 | Husseini et al. | |
| 2002/0084543 A1* | 7/2002 | Buja | B29C 45/78 264/40.4 |
| 2003/0101891 A1 | 6/2003 | Amick | |
| 2003/0217665 A1 | 11/2003 | Rennard | |
| 2004/0159262 A1 | 8/2004 | LeaSure | |
| 2005/0005807 A1 | 1/2005 | Wiley | |
| 2005/0016411 A1 | 1/2005 | Amick | |
| 2005/0056183 A1 | 3/2005 | Meshirer | |
| 2005/0188883 A1 | 9/2005 | Husseini et al. | |
| 2005/0257711 A1 | 11/2005 | Husseini et al. | |
| 2005/0257712 A1 | 11/2005 | Husseini et al. | |
| 2005/0268808 A1 | 12/2005 | Werner | |
| 2006/0027129 A1 | 2/2006 | Kolb et al. | |
| 2006/0090603 A1* | 5/2006 | Lewis | B22F 3/225 76/56 |
| 2006/0207464 A1* | 9/2006 | Maljkovic | C08L 65/02 102/466 |
| 2006/0246167 A1* | 11/2006 | Buja | B29C 45/77 425/144 |
| 2006/0283314 A1 | 12/2006 | Cesaroni | |
| 2007/0214992 A1 | 9/2007 | Dittrich | |
| 2007/0261587 A1* | 11/2007 | Chung | F42B 5/313 102/469 |
| 2009/0042057 A1 | 2/2009 | Thomas et al. | |
| 2009/0183850 A1* | 7/2009 | Morrison | B22F 5/009 164/91 |
| 2010/0016518 A1 | 1/2010 | El-Hibri et al. | |
| 2010/0234132 A1* | 9/2010 | Hirsch | A63B 53/04 473/340 |
| 2010/0258023 A1 | 10/2010 | Reynolds et al. | |
| 2010/0282112 A1* | 11/2010 | Battaglia | F42B 5/307 102/467 |
| 2010/0300319 A1 | 12/2010 | Guindon | |
| 2010/0305261 A1 | 12/2010 | Maljkovic et al. | |
| 2011/0016717 A1* | 1/2011 | Morrison | B22F 3/105 29/889.72 |
| 2011/0179965 A1 | 7/2011 | Mason | |
| 2011/0226149 A1 | 9/2011 | Tepe et al. | |
| 2012/0022418 A1 | 1/2012 | Klein | |
| 2012/0111219 A1* | 5/2012 | Burrow | F42B 5/307 102/467 |
| 2012/0152101 A1 | 6/2012 | Engleman et al. | |
| 2012/0180687 A1 | 7/2012 | Padgett et al. | |
| 2012/0180688 A1* | 7/2012 | Padgett | F42B 5/313 102/466 |
| 2013/0014664 A1* | 1/2013 | Padgett | F42B 5/313 102/439 |
| 2013/0180392 A1 | 7/2013 | Nuetzman et al. | |
| 2013/0186294 A1 | 7/2013 | Davies et al. | |
| 2014/0060372 A1 | 3/2014 | Padgett | |
| 2014/0060373 A1 | 3/2014 | Maljkovic et al. | |
| 2014/0076188 A1 | 3/2014 | Maljkovic et al. | |
| 2014/0216293 A1 | 8/2014 | Klein et al. | |
| 2014/0224144 A1 | 8/2014 | Neugebauer | |
| 2014/0235784 A1 | 8/2014 | Maljkovic et al. | |
| 2014/0260925 A1 | 9/2014 | Beach et al. | |
| 2014/0261046 A1 | 9/2014 | Marx | |
| 2014/0326157 A1 | 11/2014 | Conroy | |
| 2014/0345488 A1 | 11/2014 | Schluckebier et al. | |
| 2014/0373744 A1 | 12/2014 | Padgett | |
| 2015/0007716 A1 | 1/2015 | MacVicar et al. | |
| 2015/0033970 A1 | 2/2015 | Maljkovic et al. | |
| 2015/0033990 A1 | 2/2015 | Yeager | |
| 2015/0075400 A1 | 3/2015 | Lemke et al. | |
| 2015/0219573 A1 | 8/2015 | Lukay et al. | |
| 2015/0226220 A1 | 8/2015 | Bevington | |
| 2015/0241183 A1 | 8/2015 | Padgett et al. | |
| 2015/0241184 A1 | 8/2015 | Burrow | |
| 2015/0260490 A1 | 9/2015 | Burrow | |
| 2015/0260491 A1 | 9/2015 | Burrow | |
| 2015/0260495 A1 | 9/2015 | Burrow | |
| 2015/0330756 A1 | 11/2015 | Ward | |
| 2015/0360587 A1 | 12/2015 | Hoffmann et al. | |
| 2016/0003587 A1 | 1/2016 | Burrow | |
| 2016/0003588 A1 | 1/2016 | Burrow | |
| 2016/0003589 A1 | 1/2016 | Burrow | |
| 2016/0003590 A1 | 1/2016 | Burrow | |

(56) References Cited

U.S. PATENT DOCUMENTS

| | | |
|---|---|---|
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0033241 A1 | 2/2016 | Burrow |
| 2016/0033246 A1 | 2/2016 | Burrow |
| 2016/0102030 A1 | 4/2016 | Coffey et al. |
| 2016/0131464 A1 | 5/2016 | Rubin |
| 2016/0153757 A1 | 6/2016 | Mahnke |
| 2016/0161232 A1 | 6/2016 | Rubin |
| 2016/0238355 A1 | 8/2016 | Dionne et al. |
| 2016/0245626 A1 | 8/2016 | Drieling et al. |
| 2016/0265886 A1 | 9/2016 | Aldrich et al. |
| 2016/0273896 A1 | 9/2016 | Emary |
| 2016/0349022 A1 | 12/2016 | Burrow |
| 2016/0349023 A1 | 12/2016 | Burrow |
| 2016/0349028 A1 | 12/2016 | Burrow |
| 2016/0356581 A1 | 12/2016 | Burrow |
| 2016/0356588 A1 | 12/2016 | Burrow |
| 2016/0377399 A1 | 12/2016 | Burrow |
| 2017/0080498 A1 | 3/2017 | Burrow |
| 2017/0082409 A1 | 3/2017 | Burrow |
| 2017/0082411 A1 | 3/2017 | Burrow |
| 2017/0089672 A1 | 3/2017 | Burrow |
| 2017/0089673 A1 | 3/2017 | Burrow |
| 2017/0089674 A1 | 3/2017 | Burrow |
| 2017/0089675 A1 | 3/2017 | Burrow |
| 2017/0089679 A1 | 3/2017 | Burrow |

FOREIGN PATENT DOCUMENTS

| | | |
|---|---|---|
| EP | 2625486 A1 | 8/2013 |
| GB | 783023 | 9/1957 |
| WO | 2000034732 | 6/2000 |
| WO | 2007014024 A2 | 2/2007 |
| WO | 2012047615 A1 | 4/2012 |
| WO | 2012097317 A2 | 7/2012 |
| WO | 2012097320 A1 | 7/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |

OTHER PUBLICATIONS

Korean Intellectual Property Office (ISA), International Search Report and Written Opinion for PCT/US2011/062781 dated Nov. 30, 2012, 16 pp.

* cited by examiner

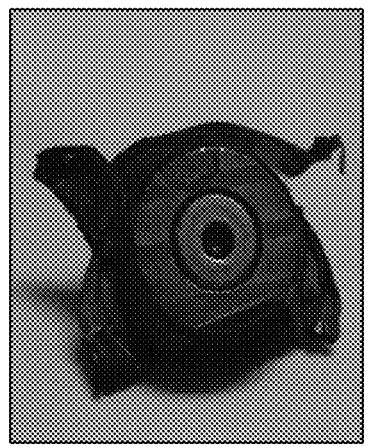 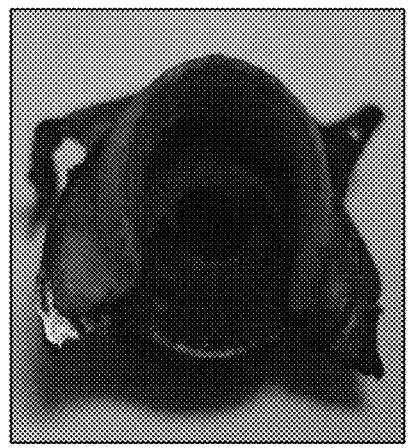
FIG. 4a        FIG. 4b
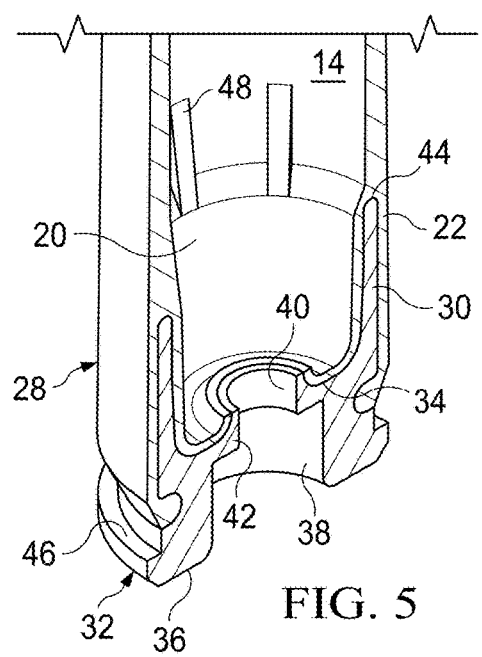
FIG. 5

LIGHTWEIGHT POLYMER AMMUNITION CARTRIDGE CASINGS

CROSS-REFERENCE TO RELATED APPLICATIONS

This application is a Continuation-in-Part of U.S. application Ser. No. 14/011,202 entitled "Lightweight Polymer Ammunition Cartridge Casings" filed on Aug. 27, 2013, which is a Divisional of U.S. patent application Ser. No. 13/292,843 entitled "Lightweight Polymer Ammunition Cartridge Casings" filed on Nov. 9, 2011 which issued as U.S. Pat. No. 8,561,543 on Oct. 22, 2013, which claims priority to U.S. Provisional Application Ser. No. 61/456,664 entitled "Polymer Case Ammunition and Methods of Manufacturing the Same (diffuser and exacter insert)" filed on Nov. 10, 2010. The contents of which are incorporated by reference in their entirety.

TECHNICAL FIELD OF THE INVENTION

The present invention relates in general to the field of ammunition, specifically to compositions of matter and methods of making and using substantially cylindrical inserts made by metal injection molding.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with lightweight polymer cartridge casing ammunition. Conventional ammunition cartridge casings for rifles and machine guns, as well as larger caliber weapons, are made from brass, which is heavy, expensive, and potentially hazardous. There exists a need for an affordable lighter weight replacement for brass ammunition cartridge cases that can increase mission performance and operational capabilities. Lightweight polymer cartridge casing ammunition must meet the reliability and performance standards of existing fielded ammunition and be interchangeable with brass cartridge casing ammunition in existing weaponry. Reliable cartridge casings manufacturing requires uniformity (e.g., bullet seating, bullet-to-casing fit, casing strength, etc.) from one cartridge to the next in order to obtain consistent pressures within the casing during firing prior to bullet and casing separation to create uniformed ballistic performance. Plastic cartridge casings have been known for many years but have failed to provide satisfactory ammunition that could be produced in commercial quantities with sufficient safety, ballistic, handling characteristics, and survive physical and natural conditions to which it will be exposed during the ammunition's intended life cycle; however, these characteristics have not been achieved.

For example, U.S. patent application Ser. No. 11/160,682 discloses a base for a cartridge casing body for an ammunition article, the base having an ignition device; an attachment device at one end thereof, the attachment device being adapted to the base to a cartridge casing body; wherein the base is made from plastic, ceramic, or a composite material.

U.S. Pat. No. 7,610,858 discloses an ammunition cartridge assembled from a substantially cylindrical polymeric cartridge casing body defining a casing headspace with an open projectile-end and an end opposing the projectile-end, wherein the casing body has a substantially cylindrical injection molded polymeric bullet-end component with opposing first and second ends, the first end of which is the projectile-end of the casing body and the second end has a male or female coupling element; and a cylindrical polymeric middle body component with opposing first and second ends, wherein the first end has a coupling element that is a mate for the projectile-end coupling element and joins the first end of the middle body component to the second end of the bullet-end component, and the second end is the end of the casing body opposite the projectile end and has a male or female coupling element; and a cylindrical cartridge casing head-end component with an essentially closed base end with a primer hole opposite an open end with a coupling element that is a mate for the coupling element on the second end of the middle body and joins the second end of the middle body component to the open end of the head-end component; wherein the middle body component is formed from a material more ductile than the material head-end component is formed from but equal or less ductile than the material the bullet-end component is formed from. Methods for assembling ammunition cartridges and ammunition cartridges having the headspace length larger than the corresponding headspace length of the chamber of the intended weapon measured at the same basic diameter for the cartridge casing without being so large as to jam the weapon or otherwise interfere with its action are also disclosed.

Shortcomings of the known methods of producing plastic or substantially plastic ammunition include the possibility of the projectile being pushed into the cartridge casing, the bullet pull being too light such that the bullet can fall out, the bullet pull being too insufficient to create sufficient chamber pressure, the bullet pull not being uniform from round to round, and portions of the cartridge casing breaking off upon firing causing the weapon to jam or damage or danger when subsequent rounds are fired or when the casing portions themselves become projectiles. To overcome the above shortcomings, improvements in cartridge case design and performance polymer materials are needed.

BRIEF SUMMARY OF THE INVENTION

One embodiment of the present invention provides a method of making a substantially cylindrical insert by metal injection molding comprising the steps of: providing a mold of the substantially cylindrical insert to form a substantially cylindrical insert mold; providing a feedstock comprising a powdered metal and a first binding agent and a second binding agent; injection molding the feedstock into the substantially cylindrical insert mold to form an substantially cylindrical insert having a first size; debinding the substantially cylindrical insert to remove the first binding agent; and sintering the substantially cylindrical insert to remove the second binding agent and form a finished substantially cylindrical insert having a second size. The substantially cylindrical insert comprising a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The powdered metal comprises stainless steel.

One embodiment of the present invention provides an ammunition cartridge comprising: a substantially cylindrical insert made by the process comprising providing a mold of the substantially cylindrical insert to form a substantially cylindrical insert mold; providing a feedstock comprising a powdered metal and a first binding agent and a second binding agent; injection molding the feedstock into the substantially cylindrical insert mold to form an substantially cylindrical insert having a first size; debinding the substantially cylindrical insert to remove the first binding agent; and sintering the substantially cylindrical insert to remove the second binding agent and form a finished substantially cylindrical insert having a second size; and bonded to a substantially cylindrical polymeric middle body comprising a substantially cylindrical polymeric bullet-end and a substantially cylindrical polymeric coupling end connected by a powder chamber, wherein the substantially cylindrical polymeric coupling end extends over the substantially cylindrical coupling element and covers an circumferential surface of the primer flash hole.

The substantially cylindrical polymeric middle body may include a nylon polymer. The substantially cylindrical insert may include adhesively fitted to the substantially cylindrical polymeric middle body. The substantially cylindrical insert may be adhesively fitted to the substantially cylindrical polymeric middle body with a curable polymer adhesive. The substantially cylindrical insert, the substantially cylindrical polymeric middle body or both may include a coating to adjust the shrinkage.

One embodiment of the present invention includes a substantially cylindrical insert mold for making a substantially cylindrical insert by metal injection molding comprising: a top surface opposite a bottom surface and a substantially cylindrical coupling element that extends from the bottom surface; a primer recess in the top surface that extends toward the bottom surface; a primer flash hole positioned in the primer recess to extend through the bottom surface; and a flange that extends circumferentially about an outer edge of the top surface.

One embodiment of the present invention provides a polymeric ammunition cartridge. The cartridge includes a substantially cylindrical insert connected to a substantially cylindrical polymeric middle body. The substantially cylindrical insert includes a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The substantially cylindrical polymeric middle body includes a substantially cylindrical polymeric bullet-end and a substantially cylindrical polymeric coupling end connected by a powder chamber, wherein the substantially cylindrical polymeric coupling end extends over the substantially cylindrical coupling element and covers a circumferential surface of the primer flash hole. Other embodiments include the primer inserted into the primer recess, the charge located in the powder chamber, and/or a bullet or projectile.

One embodiment of the present invention provides a method of making an ammunition cartridge comprising: providing a metal injection molded substantially cylindrical insert made by providing a mold of the substantially cylindrical insert to form a substantially cylindrical insert mold; providing a feedstock comprising a powdered metal and a first binding agent and a second binding agent; injection molding the feedstock into the substantially cylindrical insert mold to form an substantially cylindrical insert having a first size; debinding the substantially cylindrical insert to remove the first binding agent; and sintering the substantially cylindrical insert to remove the second binding agent and form a finished substantially cylindrical insert having a second size; providing a substantially cylindrical polymeric middle body comprising a substantially cylindrical polymeric bullet-end and a substantially cylindrical polymeric coupling end connected by a powder chamber, and bonding the substantially cylindrical polymeric coupling end to the metal injection molded substantially cylindrical insert to form a bonded ammunition cartridge; and curing the bonded ammunition cartridge. In addition the present invention provides the further step of applying a coating to adjust the shrinkage to the substantially cylindrical insert, the substantially cylindrical polymeric middle body or both.

In one embodiment the substantially cylindrical polymeric middle body is formed from a ductile polymer, more preferably a nylon polymer. In one embodiment the substantially cylindrical polymeric middle body is formed from a fiber-reinforced polymeric composite. In one embodiment the fiber-reinforced polymeric composite contains between about 10 and about 70 weight percent glass fiber fillers, mineral fillers, or mixtures thereof. In one embodiment the substantially cylindrical polymeric bullet-end and bullet are further welded or bonded together.

The substantially cylindrical polymeric bullet-end may include a forward opening end having a first and a second mechanical interlock for engagement between the forward opening end and a bullet. In one embodiment the forward opening end includes two or more cannelures formed on an outer circumferential surface of the forward opening end. In one embodiment the forward opening end comprises one, two or more annular rings that mate with one, two or more corresponding annular grooves positioned on the bullet. The forward opening end is crimped so that a polymeric material flows into an annular groove of a bullet. In one embodiment the bullet is adhesively fitted to the forward opening end; however, in other embodiment, the bullet is fitted to the forward opening end by welding or bonding together using solvent, adhesive, spin-welding, vibration-welding, ultrasonic-welding or laser-welding techniques.

In one embodiment the substantially cylindrical polymeric bullet-end includes a cannelure or mechanical interlock for engagement between the forward opening end and a bullet at the shoulder end of the forward opening end. Although the mechanical interlock is located in the lower portion of the bullet at the shoulder end it may also be located at any position from the entrance or the end of the cylindrical polymeric bullet-end. Furthermore, the mechanical interlock/cannelure may include 1, 2, 3, 4, 5, or more mechanical interlocks/cannelures. The substantially cylindrical polymeric bullet-end may be connected to the bullet through an adhesive or weld. In addition, a combination of adhesives or welds, etc and 1, 2, 3, 4, 5, or more mechanical interlocks/cannelures may be used.

The substantially cylindrical polymeric bullet-end may include a forward opening end having a first and a second mechanical interlock for engagement between the forward opening end and a bullet. In one embodiment the forward opening end includes two or more cannelures formed on an outer circumferential surface of the forward opening end. In one embodiment the forward opening end comprises one, two or more annular rings that mate with one, two or more corresponding annular grooves positioned on the bullet. The forward opening end is crimped so that a polymeric material flows into an annular groove of a bullet. In one embodiment the bullet is adhesively fitted to the forward opening end; however, in other embodiment, the bullet is fitted to the forward opening end by welding or bonding together using solvent, adhesive, spin-welding, vibration-welding, ultrasonic-welding or laser-welding techniques.

In one embodiment the substantially cylindrical polymeric middle body includes polymers selected from the group consisting of polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers.

The forward opening end comprises a neck with a plurality of internal structures for supporting a bullet. The substantially cylindrical coupling element is a male coupling element with a straight skirt interlock surface that tapers to a smaller diameter at the forward portion on the skirt tip to mate with a female coupling element of the substantially cylindrical polymeric coupling end. In one embodiment the polymeric ammunition cartridge further includes a diffuser positioned in the primer recess comprising a diffuser flash hole aligned with the primer flash hole.

Another embodiment of the polymeric ammunition cartridge having a diffuser of the present invention includes a substantially cylindrical insert, a diffuser, and a substantially cylindrical polymeric middle body. The substantially cylindrical insert includes a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. The diffuser positioned in the primer recess comprising a diffuser flash hole aligned with the primer flash hole. The substantially cylindrical polymeric middle body includes a substantially cylindrical polymeric bullet-end and a substantially cylindrical polymeric coupling end connected by a powder chamber, wherein the substantially cylindrical polymeric coupling end extends over the substantially cylindrical coupling element and covers a circumferential surface of the primer flash hole. The diffuser has a primer flash hole with a flash hole lip extending into a bore of the primer flash hole.

Another embodiment of the polymeric ammunition cartridge of the present invention includes a substantially cylindrical insert having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface; a substantially cylindrical polymeric middle body comprising a substantially cylindrical polymeric bullet-end and a substantially cylindrical polymeric coupling end connected by a powder chamber, wherein the substantially cylindrical polymeric coupling end extends over the substantially cylindrical coupling element and covers an circumferential surface of the primer flash hole; and a substantially cylindrical polymeric bullet-end upper portion comprising a bullet-end coupling element connected to the substantially cylindrical polymeric bullet-end and a forward opening end to engage a bullet.

Another embodiment of the polymeric ammunition cartridge of the present invention includes a metal insert for a polymeric ammunition cartridge having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. In other embodiments the polymeric ammunition cartridge, further includes a diffuser positioned in the primer recess comprising a diffuser flash hole aligned with the primer flash hole.

Another embodiment of the polymeric ammunition cartridge of the present invention includes a polymer insert for a polymeric ammunition cartridge having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface. In other embodiments the polymeric ammunition cartridge, further includes a diffuser positioned in the primer recess.

Still another embodiment includes a method of forming a polymeric ammunition cartridge by providing a substantially cylindrical insert having a top surface opposite a bottom surface and a substantially cylindrical coupling element that extends from the bottom surface, a primer recess in the top surface that extends toward the bottom surface, a primer flash hole positioned in the primer recess to extend through the bottom surface, and a flange that extends circumferentially about an outer edge of the top surface, forming a substantially cylindrical polymeric middle body comprising a substantially cylindrical polymeric bullet-end and a substantially cylindrical polymeric coupling end connected by a powder chamber, connecting the substantially cylindrical polymeric coupling end to the substantially cylindrical coupling element; and covering circumferentially an interior surface of the primer flash hole. The method further includes the step of positioning a diffuser comprising a diffuser flash hole in the primer recess and aligning the diffuser flash hole with the primer flash hole.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which:

FIGS. 4a and 4b depict images of a catastrophic failure of the polymeric cartridge case of FIG. 3;

FIG. 5 depicts a side, cross-sectional view of a portion of the polymeric cartridge case displaying ribs according to one embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Reliable cartridge manufacture requires uniformity from one cartridge to the next in order to obtain consistent ballistic performance. Among other considerations, proper bullet seating and bullet-to-casing fit is required. In this manner, a desired pressure develops within the casing during firing prior to bullet and casing separation. Historically, bullets employ a cannelure, which is a slight annular depression formed in a surface of the bullet at a location determined to be the optimal seating depth for the bullet. In this manner, a visual inspection of a cartridge could determine whether or not the bullet is seated at the proper depth. Once the bullet is inserted into the casing to the proper depth, one of two standard procedures is incorporated to lock the bullet in its proper location. One method is the crimping of the entire end of the casing into the cannelure. A second method does not crimp the casing end; rather the bullet is pressure fitted into the casing.

The polymeric ammunition cartridges of the present invention are of a caliber typically carried by soldiers in combat for use in their combat weapons. The present invention is not limited to the described caliber and is believed to be applicable to other calibers as well. This includes various small and medium caliber munitions, including 5.56 mm, 7.62 mm and 0.50 caliber ammunition cartridges, as well as medium/small caliber ammunition such as 380 caliber, 38 caliber, 9 mm, 10 mm, 20 mm, 25 mm, 30 mm, 40 mm, 45 caliber and the like. The cartridges, therefore, are of a caliber between about 0.05 and about 5 inches. Thus, the present invention is also applicable to the sporting goods industry for use by hunters and target shooters.

Figure 1:
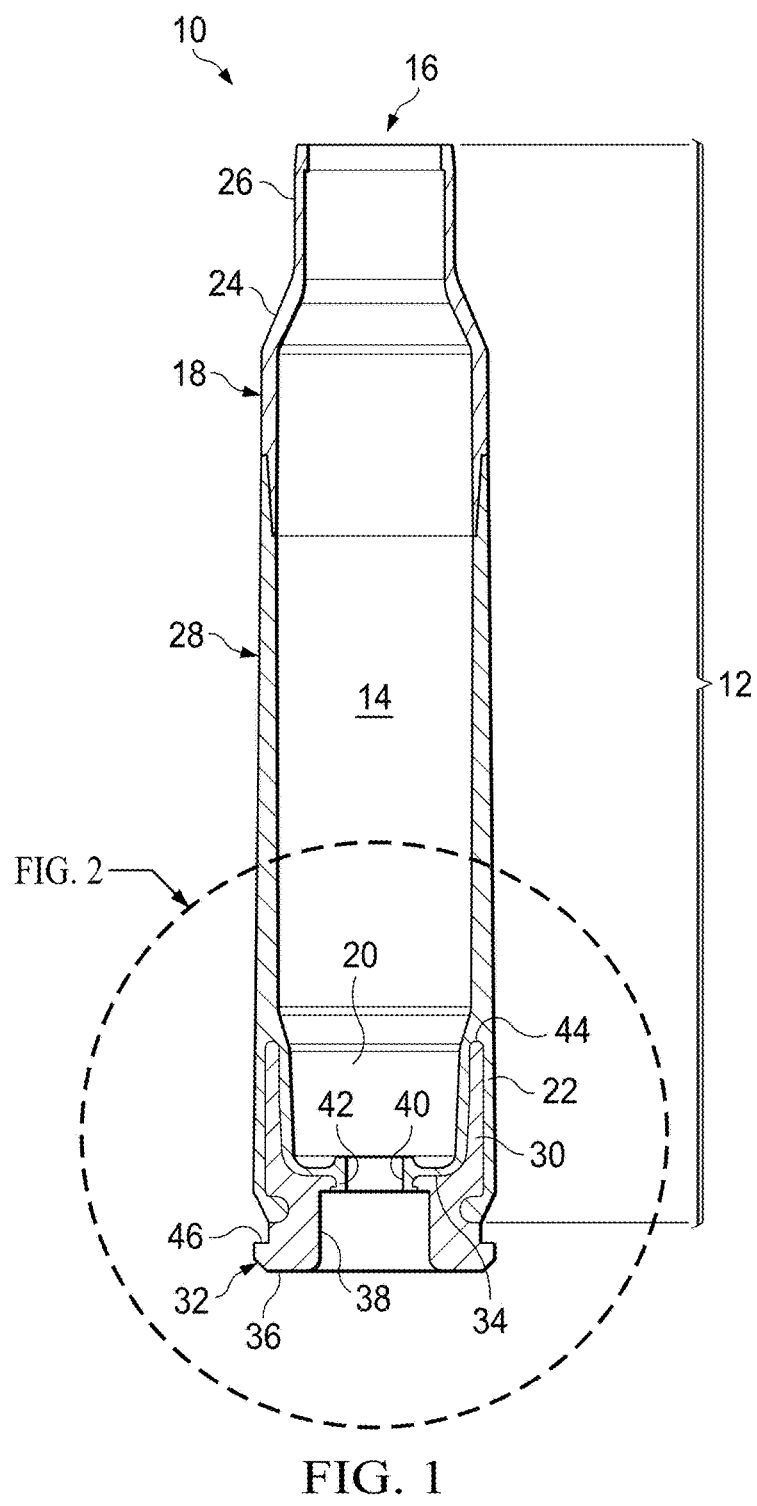
FIG. 1 depicts a side, cross-sectional view of a polymeric cartridge case according to one embodiment of the present invention.

FIG. 1 depicts a side, cross-sectional view of a polymeric cartridge case according to one embodiment of the present invention. A cartridge 10 suitable for use with high velocity rifles is shown manufactured with a polymer casing 12 showing a powder chamber 14 with projectile (not shown) inserted into the forward end opening 16. Polymer casing 12 has a substantially cylindrical open-ended polymeric bullet-end 18 extending from forward end opening 16 rearward to opposite end 20. The bullet-end component 18 may be formed with coupling end 22 formed on end 20. Coupling end 22 is shown as a female element, but may also be configured as a male element in alternate embodiments of the invention. The forward end of bullet-end component 18 has a shoulder 24 forming chamber neck 26. The bullet-end component typically has a wall thickness between about 0.003 and about 0.200 inches and more preferably between about 0.005 and more preferably between about 0.150 inches about 0.010 and about 0.050 inches.

The middle body component 28 is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 of bullet-end component 18 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing 12 also has a substantially cylindrical open-ended middle body component 28. The middle body component extends from a forward end opening 16 to coupling element 22. The middle body component typically has a wall thickness of between about 0.003 and about 0.200 inches and more preferably between about 0.005 and about 0.150 inches; or about 0.010 and about 0.050 inches.

The bullet-end 16, middle body 18 and bottom surface 34 define the interior of powder chamber 14 in which the powder charge (not shown) is contained. The interior volume of powder chamber 14 may be varied to provide the volume necessary for complete filling of the chamber 14 by the propellant chosen so that a simplified volumetric measure of propellant can be utilized when loading the cartridge. Either a particulate or consolidated propellant can be used.

The substantially cylindrical insert 32 also has a flange 46 cut therein and a primer recess 38 formed therein for ease of insertion of the primer (not shown). The primer recess 38 is sized so as to receive the primer (not shown) in an interference fit during assembly. A primer flash hole 40 communicates through the bottom surface 34 of substantially cylindrical insert 32 into the powder chamber 14 so that upon detonation of primer (not shown) the powder in powder chamber 14 will be ignited.

Projectile (not shown) is held in place within chamber case neck 26 at forward opening 16 by an interference fit. Mechanical crimping of the forward opening 16 can also be applied to increase the bullet pull force. The bullet (not shown) may be inserted into place following the completion of the filling of powder chamber 14. Projectile (not shown) can also be injection molded directly onto the forward opening 16 prior to welding or bonding together using solvent, adhesive, spin-welding, vibration-welding, ultrasonic-welding or laser-welding techniques. The welding or bonding increases the joint strength so the casing can be extracted from the hot gun casing after firing at the cook-off temperature.

The bullet-end and bullet components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature. An optional first and second annular grooves (cannelures) may be provided in the bullet-end in the interlock surface of the male coupling element to provide a snap-fit between the two components. The cannelures formed in a surface of the bullet at a location determined to be the optimal seating depth for the bullet. Once the bullet is inserted into the casing to the proper depth to lock the bullet in its proper location. One method is the crimping of the entire end of the casing into the cannelures.

The bullet-end and middle body components can then be welded or bonded together using solvent, adhesive, spin-welding, vibration-welding, ultrasonic-welding or laser-welding techniques. The welding or bonding increases the joint strength so the casing can be extracted from the hot gun casing after firing at the cook-off temperature.

Figure 2:
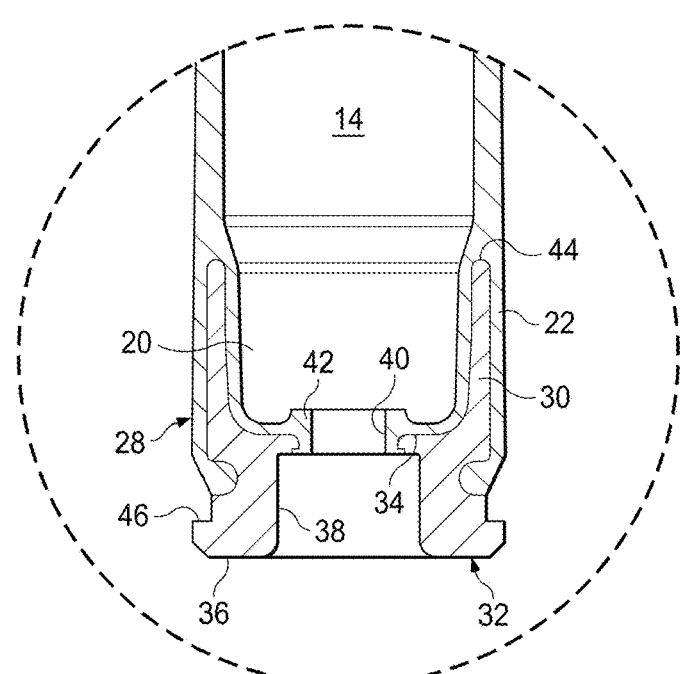
FIG. 2 depicts a side, cross-sectional view of a portion of the polymeric cartridge case according to one embodiment of the present invention.

FIG. 2 depicts a side, cross-sectional view of a portion of the polymeric cartridge case according to one embodiment of the present invention. A portion of a cartridge suitable for use with high velocity rifles is shown manufactured with a polymer casing (not shown) showing a powder chamber 14. Polymer casing (not shown) has a substantially cylindrical opposite end 20. The bullet-end component (not shown) may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations are acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer recess 28 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 also has a flange 46 cut therein and middle body component 28. Polymer casing 12 also has a substantially cylindrical open-ended middle body component 28.

Figure 3:
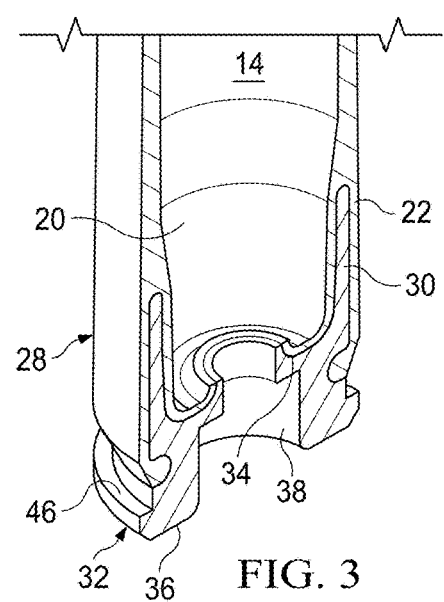
FIG. 3 depicts a side, cross-sectional view of a portion of the polymeric cartridge case lacking the aperture coating.

FIG. 3 depicts a side, cross-sectional view of a portion of the polymeric cartridge case lacking the aperture coating (not shown). A portion of a cartridge suitable for use with high velocity rifles is shown manufactured with a polymer casing (not shown) showing a powder chamber 14. Polymer casing (not shown) has a substantially cylindrical opposite end 20. The bullet-end component (not shown) may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations are acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole (not shown) is located in the primer recess 28 and extends through the bottom surface 34 into the powder chamber 14. When contacted the coupling end 22 interlocks with the substantially cylindrical coupling element 30, through the coupling element 30 that extends with a taper to a smaller diameter at the tip (not shown) to form a physical interlock between substantially cylindrical insert 32 also has a flange 46 cut therein and middle body component (not shown).

FIGS. 4a and 4b depict images of a catastrophic failure of the polymeric cartridge case of FIG. 3. Other polymeric cartridge case was tested and resulted in catastrophic failure with the rounds blowing the magazine out of the weapon and fragmenting the metal insert and lodging the polymer case in the chamber. The examination of the catastrophic failure revealed the tearing of the polymer at the top of the insert. As a result, in some embodiments the height of the insert was reduced by 0.020" to reduce the tearing and frequency of catastrophic failures. Further examination, revealed that the polymer at the flash hole of the base was separating from the insert. One embodiment locks the polymer into the flash hole by extending the polymer into the flash hole. In addition, the raised area was removed, the diameter of the flash hole was opened, and the primer side was counter bored. Other embodiments may incorporate all, one, or a combination of 2 or more of these elements to stop the gas from separating the polymer from the insert that was creating combustion between the insert and the polymer.

FIG. 5 depicts a side, cross-sectional view of a portion of the polymeric cartridge case displaying ribs according to one embodiment of the present invention. A portion of a cartridge suitable for use with high velocity rifles is shown manufactured with a polymer casing (not shown) showing a powder chamber 14. Polymer casing (not shown) has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30, extending from a bottom surface 34 that is opposite a top surface 36. Located in the top surface 36 is a primer recess 38 that extends toward the bottom surface 34. A primer flash hole 40 is located in the primer recess 28 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 also has a flange 46 cut therein and middle body component 28. Polymer casing (not shown) also has a substantially cylindrical open-ended middle body component 28. The substantially cylindrical opposite end 20 or anywhere within the powder chamber 14 may include one or more ribs 48 on the surface. The number of ribs 48 will depend on the specific application and desire of the manufacture but may include 1, 2, 3, 4, 5 6, 7, 8, 9, 10, or more ribs. In the counter bore, the polymer was having difficulty filling this area due to the fact that the polymer used has fillers in it, and needed to be reblended during molding. One embodiment includes six ribs 48 to create turbulence in the flow of the polymer, thus allowing the material to fill the counter bore.

Figure 6:
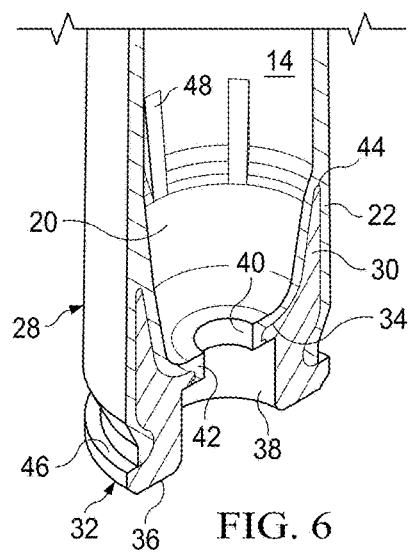
FIG. 6 depicts a side, cross-sectional view of a portion of the polymeric cartridge case displaying ribs according to one embodiment of the present invention.

FIG. 6 depicts a side, cross-sectional view of a portion of the polymeric cartridge case displaying ribs according to one embodiment of the present invention. One embodiment that reduces bellowing of the insert includes a shortened insert and angled coupling element 30 inside of the insert. In addition, the raised portion of the polymer at the flash hole was removed, the internal polymer wall was lowered and angled to match the insert and the internal ribs were lengthened.

A portion of a cartridge suitable for use with high velocity rifles is shown manufactured with a polymer casing (not shown) showing a powder chamber 14. Polymer casing (not shown) has a substantially cylindrical opposite end 20. The bullet-end component (not shown) may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations are acceptable for coupling elements 30 and coupling end 22 in alternate embodiments of the invention. Coupling end 22 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer recess 28 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provide support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. Polymer casing (not shown) also has a substantially cylindrical open-ended middle body component 28. The substantially cylindrical opposite end 20 or anywhere within the powder chamber 14 may include one or more ribs 48 on the surface. The number of ribs 48 will depend on the specific application and desire of the manufacture but may include 1, 2, 3, 4, 5 6, 7, 8, 9, 10, or more ribs. In the counter bore, the polymer was having difficulty filling this area due to the fact that the polymer used has fillers in it, and needed to be reblended during molding. One embodiment includes six ribs 48 to create turbulence in the flow of the polymer, thus allowing the material to fill the counter bore. Another embodiment of the present invention is a shortened insert and angled coupling element 30 inside of the insert. In addition, raised portions of the polymer at the flash hole, lowered and angled the internal polymer wall to match the insert and lengthened the internal ribs.

Figure 7:
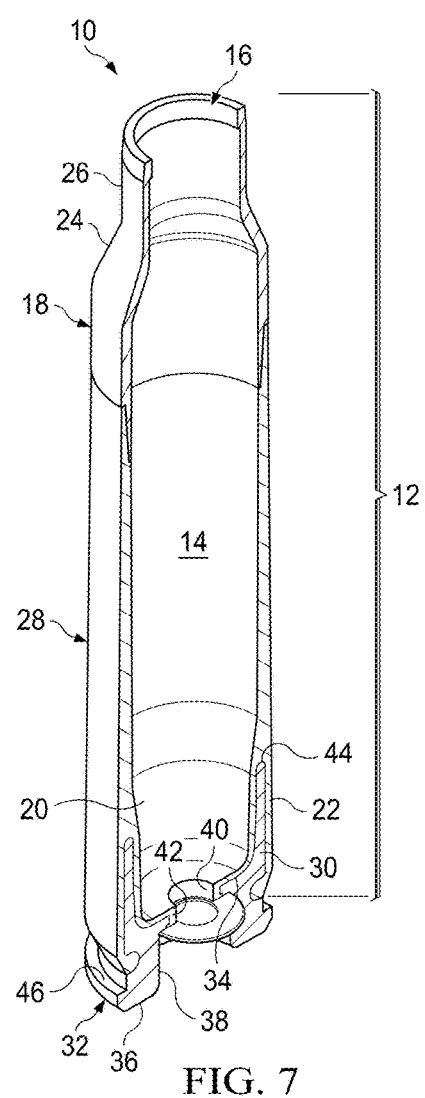
FIG. 7 depicts a side, cross-sectional view of a polymeric cartridge case having a diffuser according to one embodiment of the present invention.

FIG. 7 depicts a side, cross-sectional view of a polymeric cartridge case having a diffuser according to one embodiment of the present invention. The diffuser (not shown) is a device that is used to divert the affects of the primer off of the polymer and directing it to the flash hole. The affects being the impact from igniting the primer as far as pressure and heat. A cartridge 10 suitable for use with high velocity rifles is shown manufactured with a polymer casing (not shown) showing a powder chamber 14 with projectile (not shown) inserted into the forward end opening 16. Polymer casing (not shown) has a substantially cylindrical open-ended polymeric bullet-end 18 extending from forward end opening 16 rearward to the opposite end 20. The bullet-end component (not shown) may be formed with coupling end 22 formed on end 20. Coupling end 22 is shown as a female element, but may also be configured as a male element in alternate embodiments of the invention. The forward end of bullet-end component 18 has a shoulder 24 forming chamber neck 26.

The middle body component 28 is connected to a substantially cylindrical coupling element 30 of the substantially cylindrical insert 32. Coupling element 30, as shown may be configured as a male element, however, all combinations of male and female configurations is acceptable for coupling elements 30 and coupling end 22 in alternate embodiments of the invention. Coupling end 22 of bullet-end component 18 fits about and engages coupling element 30 of a substantially cylindrical insert 32. The substantially cylindrical insert 32 includes a substantially cylindrical coupling element 30 extending from a bottom surface 34 that is opposite a top surface 36. Located in the top surface 36 is a primer recess 38 that extends toward the bottom surface 34. A primer flash hole 40 is located in the primer recess 28 and extends through the bottom surface 34 into the powder chamber 14. The coupling end 22 extends the polymer through the primer flash hole 40 to form an aperture coating 42 while retaining a passage from the top surface 36 through the bottom surface 34 and into the powder chamber 14 to provides support and protection about the primer flash hole 40. When contacted the coupling end 22 interlocks with the substantially cylindrical coupling element 30, through the coupling element 30 that extends with a taper to a smaller diameter at the tip 44 to form a physical interlock between substantially cylindrical insert 32 also has a flange 46 cut therein and middle body component 28. Polymer casing 12 also has a substantially cylindrical open-ended middle body component 28. The middle body component extends from a forward end opening 16 to coupling element 22. Located in the top surface 36 is a primer recess 38 that extends toward the bottom surface 34 with a diffuser (not shown) positioned in the primer recess 38. The diffuser (not shown) includes a diffuser aperture (not shown) that aligns with the primer flash hole 40. The diffuser (not shown) is a device that is used to divert the affects of the primer (not shown) off of the polymer. The affects being the impact from igniting the primer as far as pressure and heat to divert the energy of the primer off of the polymer and directing it to the flash hole.

Figure 8:
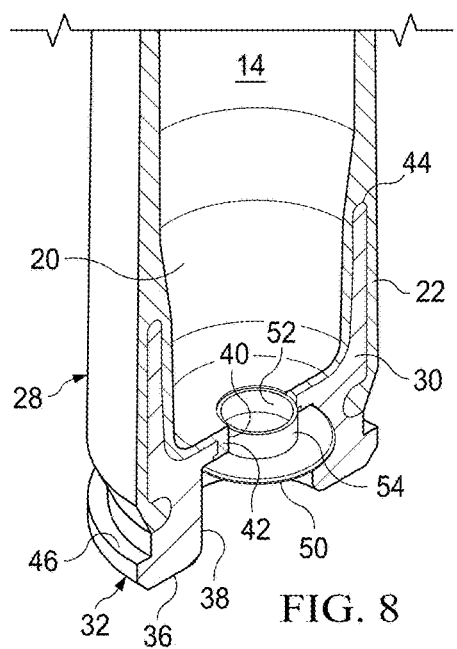
FIG. 8 depicts a side, cross-sectional view of a portion of the polymeric cartridge case having a diffuser according to one embodiment of the present invention.
Figure 9A:
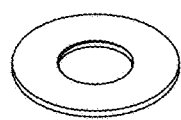
FIGS. 9a-9h depict the diffuser according to a different embodiment of the present invention.
Figure 9B:
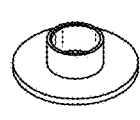
Figure 9C:
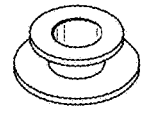
Figure 9D:
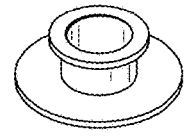
Figure 9E:
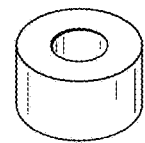
Figure 9F:
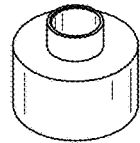
Figure 9G:
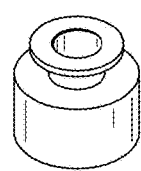
Figure 9H:
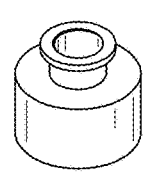

FIG. 8 depicts a side, cross-sectional view of a portion of the polymeric cartridge case having a diffuser according to one embodiment of the present invention. A portion of a cartridge suitable for use with high velocity rifles is shown manufactured with a polymer casing (not shown) showing a powder chamber 14. Polymer casing (not shown) has a substantially cylindrical opposite end 20. The bullet-end component (not shown) may be formed with coupling end 22 formed on end 20. Coupling end (not shown) is shown as a female element, but may also be configured as a male element in alternate embodiments of the invention. The middle body component (not shown) is connected to a substantially cylindrical coupling element 30 of the substantially cylindrical insert 32. Coupling element 30, as shown may be configured as a male element, however, all combinations of male and female configurations are acceptable for coupling elements 30 and coupling end (not shown) in alternate embodiments of the invention. Coupling end (not shown) fits about and engages coupling element 30 of a substantially cylindrical insert 32. The substantially cylindrical insert 32 includes a substantially cylindrical coupling element 30 extending from a bottom surface (not shown) that is opposite a top surface 36. Located in the top surface 36 is a primer recess 38 that extends toward the bottom surface (not shown). A primer flash hole 40 extends through the bottom surface (not shown) into the powder chamber 14. The coupling end (not shown) extends the polymer through the primer flash hole 40 to form an aperture coating 42 while retaining a passage from the top surface 36 through the bottom surface (not shown) and into the powder chamber 14 to provides support and protection about the primer flash hole 40. When contacted the coupling end (not shown) interlocks with the substantially cylindrical coupling element 30, through the coupling element 30 that extends with a taper to a smaller diameter at the tip 44 to form a physical interlock between substantially cylindrical insert 32 also has a flange 46 cut therein and middle body component 28. Polymer casing (not shown) also has a substantially cylindrical open-ended middle body component 28. Located in the top surface 36 is a primer recess 38 that extends toward the bottom surface (not shown) with a diffuser 50 positioned in the primer recess 38. The diffuser (not shown) includes a diffuser aperture 52 and a diffuser aperture extension 54 that aligns with the primer flash hole 40. The diffuser 50 is a device that is used to divert the affects of the primer (not shown) off of the polymer. The affects being the impact from igniting the primer as far as pressure and heat to divert the energy of the primer off of the polymer and directing it to the flash hole. The diffuser 50 can be between 0.004 to 0.010 inches in thickness and made from half hard brass. For example, the diffuser 50 can be between 0.005 inches thick for a 5.56 diffuser 50. The OD of the diffuser for a 5.56 or 223 case is 0.173 and the ID is 0.080. The Diffuser could be made of any material that can withstand the energy from the ignition of the primer. This would include steel, stainless, cooper, aluminum or even an engineered resin that was injection molded or stamped. The Diffuser can be produce in T shape by drawing the material with a stamping and draw die. In the T Diffuser the center ring can be 0.005 to 0.010 tall and the OD is 0.090 and the ID 0.080.

FIGS. 9*a*-9*h* depict different embodiment of the diffuser of the present invention.

Figure 10:
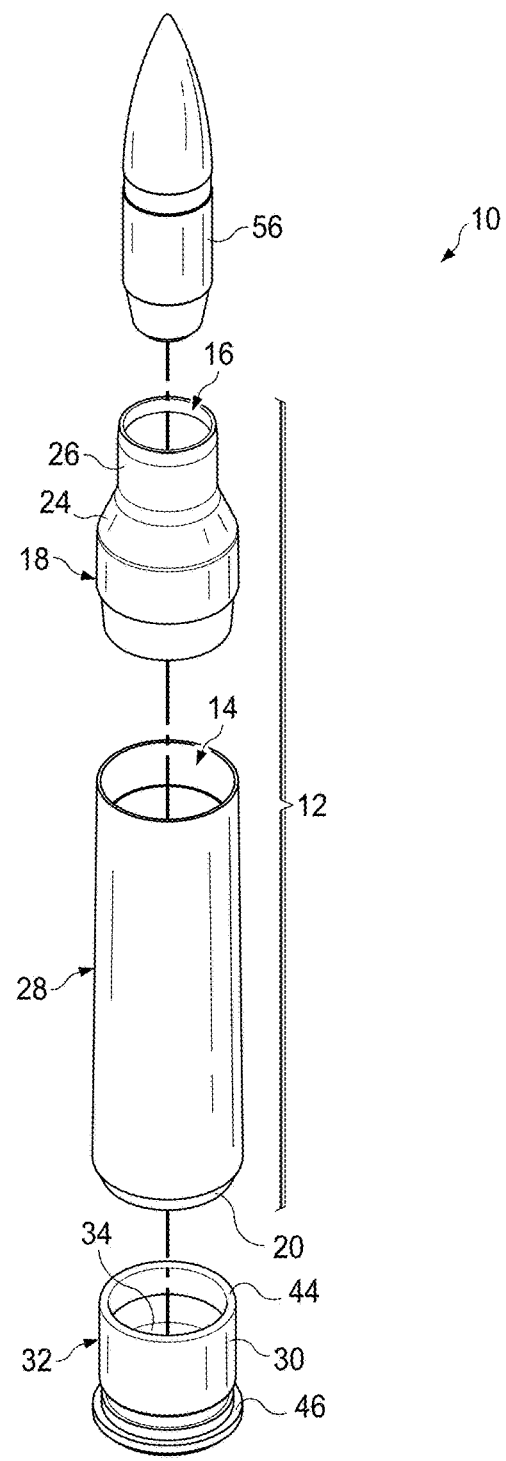
FIG. 10 depicts an exploded view of the polymeric cartridge casing.

FIG. 10 depicts an exploded view of the polymeric cartridge casing. A cartridge 10 suitable for use with high velocity rifles is shown manufactured with a middle body component 28 having a substantially cylindrical open-ended polymeric bullet-end 18 extending from forward end opening 16 rearward to opposite end 20. A portion of a cartridge suitable for use with high velocity rifles is shown manufactured with a polymer casing 12 showing a powder chamber 14. Polymer casing 12 has a substantially cylindrical opposite end 20. The bullet-end component 18 may be formed with coupling end 22 formed on end 20. Coupling end 22 is shown as a female element, but may also be configured as a male element in alternate embodiments of the invention. The middle body component (not shown) is connected to a substantially cylindrical coupling element 30 of the substantially cylindrical insert 32. The substantially cylindrical open-ended polymeric bullet-end 18 has a shoulder 24 forming chamber neck 26 and a bullet 56 inserted therein. The substantially cylindrical insert 32 also has a flange 46 cut therein and a primer recess (not shown) formed therein for ease of insertion of the primer (not shown). When contacted the coupling end 22 interlocks with the substantially cylindrical coupling element 30, through the coupling element 30 that extends with a taper to a smaller diameter at the tip 44 to form a physical interlock between substantially cylindrical insert 32 and middle body component 28. In one embodiment of the present invention, the substantially cylindrical insert 32 may be made of a metal that is formed by a metal injection molding process. The model design may be seen in FIGS. 2, 8, 9 and 10.

The molded substantially cylindrical insert 32 is then bound to the middle body component 28. In the metal injection molding process of making the substantially cylindrical insert 32 a mold is made in the shape of the substantially cylindrical insert 32 including the desired profile of the primer recess (not shown). The substantially cylindrical insert 32 includes a substantially cylindrical coupling element 30 extending from a bottom surface 34 that is opposite a top surface (not shown). Located in the top surface (not shown) is a primer recess (not shown) that extends toward the bottom surface 34. A primer flash hole (not shown) is located in the substantially cylindrical insert 32 and extends through the bottom surface 34 into the powder chamber 14. The coupling end (not shown) extends through the primer flash hole (not shown) to form an aperture coating (not shown) while retaining a passage from the top surface (not shown) through the bottom surface (not shown) and into the powder chamber 14 to provides support and protection about the primer flash hole (not shown). When contacted the coupling end (not shown) interlocks with the substantially cylindrical coupling element 30, through the coupling element 30 that extends with a taper to a smaller diameter at the tip (not shown) to form a physical interlock between substantially cylindrical insert 32 and middle body component 28.

For example, the metal injection molding process, which generally involves mixing fine metal powders with binders to form a feedstock that is injection molded into a closed mold, may be used to form a substantially cylindrical insert. After ejection from the mold, the binders are chemically or thermally removed from the substantially cylindrical insert so that the part can be sintered to high density. During the sintering process, the individual metal particles metallurgically bond together as material diffusion occurs to remove most of the porosity left by the removal of the binder.

The raw materials for metal injection molding are metal powders and a thermoplastic binder. There are at least two Binders included in the blend, a primary binder and a secondary binder. This blended powder mix is worked into the plasticized binder at elevated temperature in a kneader or shear roll extruder. The intermediate product is the so-called feedstock. It is usually granulated with granule sizes of several millimeters. In metal injection molding, only the binders are heated up, and that is how the metal is carried into the mold cavity whereas, In preparing a Feedstock, it is important first to measure the actual density of each lot of both the metal powders and binders. This is extremely important especially for the metal powders in that each lot will be different based on the actual chemistry of that grade of powder. For example, 316L is comprised of several elements, such as Fe, Cr, Ni, Cu, Mo, P, Si, S and C. In order to be rightfully called a 316L, each of these elements must meet a minimum and maximum percentage weight requirement as called out in the relevant specification. Hence the variation in the chemistry within the specification results in a significant density variation within the acceptable composition range. Depending on the lot received from the powder producer, the density will vary depending on the actual chemistry received.

Molding Many MIM companies will mold a part until they feel that the cavity has been filled. Both mold design factors such as runner and gate size, gate placement, venting and molding parameters set on the molding machine affect the molded part. A helium Pycnometer can determine if there are voids trapped inside the parts. During molding, you have a tool that can be used to measure the percent of theoretical density achieved on the "Green" or molded part. By crushing the measured "green" molded part back to powder, you can now confirm the percent of air (or voids) trapped in the molded part. To measure this, the density of the molded part should be measured in the helium Pycnometer and compared to the theoretical density of the feedstock. Then, take the same molded part that was used in the density test and crush it back to powder. If this granulate shows a density of more than 100% of that of the feedstock, then some of the primary binders have been lost during the molding process. The molding process needs to be corrected because using this process with a degraded feedstock will result in a larger shrinkage and result in a part smaller than that desired. It is vital to be sure that your molded parts are completely filled before continuing the manufacturing process for debinding and sintering. The helium Pycnometer provides this assurance. Primary debinding properly debound parts are extremely important to establish the correct sintering profile. The primary binder must be completely removed before attempting to start to remove the secondary binder as the secondary binder will travel through the pores created by the extraction of the primary binder. Primary debinding techniques depend on the feedstock type used to make the parts. However the feedstock supplier knows the amount of primary binders that have been added and should be removed before proceeding to the next process step. The feedstock supplier provides a minimum "brown density" that must be achieved before the parts can be moved into a furnace for final debinding and sintering. This minimum brown density will take into account that a small amount of the primary binder remnant may be present and could be removed by a suitable hold during secondary debinding and sintering. The sintering profile should be adjusted to remove the remaining small percent of primary binder before the removal of the secondary binder. Most external feedstock manufacturers provide only a weight loss percent that should be obtained to define suitable debinding. Solvent debound parts must be thoroughly dried, before the helium Pycnometer is used to determine the "brown" density so that the remnant solvent in the part does not affect the measured density value. When the feedstock manufacturer gives you the theoretical density of the "brown" or debound part, can validate the percent of debinding that has been achieved. Most MIM operations today perform the secondary debinding and sintering in the same operation. Every MIM molder has gates and runners left over from molding their parts. So, you will be able to now re-use your gates and runners with confidence that they will shrink correctly after sintering. If the feedstock producers have given you the actual and theoretical densities of their feedstock, you can easily measure the densities of the gates and runners and compare the results to the values supplied. Once the regrind densities are higher than that required to maintain the part dimensions, the regrinds are no longer reusable.

Feedstock in accordance with the present invention may be prepared by blending the powdered metal with the binder and heating the blend to form a slurry. Uniform dispersion of the powdered metal in the slurry may be achieved by employing high shear mixing. The slurry may then be cooled to ambient temperature and then granulated to provide the feedstock for the metal injection molding.

The amount of powdered metal and binder in the feedstock may be selected to optimize moldability while insuring acceptable green densities. In one embodiment, the feedstock used for the metal injection molding portion of the invention may include at least about 40 percent by weight powdered metal, in another about 50 percent by weight powdered metal or more. In one embodiment, the feedstock includes at least about 60 percent by weight powdered metal, preferably about 65 percent by weight or more powdered metal. In yet another embodiment, the feedstock includes at least about 75 percent by weight powdered metal. In yet another embodiment, the feedstock includes at least about 80 percent by weight powdered metal. In yet another embodiment, the feedstock includes at least about 85 percent by weight powdered metal. In yet another embodiment, the feedstock includes at least about 90 percent by weight powdered metal.

The binding agent may be any suitable binding agent that does not destroy or interfere with the powdered metals. The binder may be present in an amount of about 50 percent or less by weight of the feedstock. In one embodiment, the binder is present in an amount ranging from 10 percent to about 50 percent by weight. In another embodiment, the binder is present in an amount of about 25 percent to about 50 percent by weight of the feedstock. In another embodiment, the binder is present in an amount of about 30 percent to about 40 percent by weight of the feedstock. In one embodiment, the binder is an aqueous binder. In another embodiment, the binder is an organic-based binder. Examples of binders include, but are not limited to, thermoplastic resins, waxes, and combinations thereof. Non-limiting examples of thermoplastic resins include polyolefins such as acrylic polyethylene, polypropylene, polystyrene, polyvinyl chloride, polyethylene carbonate, polyethylene glycol, and mixtures thereof. Suitable waxes include, but are not limited to, microcrystalline wax, bee wax, synthetic wax, and combinations thereof.

Examples of suitable powdered metals for use in the feedstock include, but are not limited to: stainless steel including martensitic and austenitic stainless steel, steel alloys, tungsten alloys, soft magnetic alloys such as iron, iron-silicon, electrical steel, iron-nickel (50Ni-50F3), low thermal expansion alloys, or combinations thereof. In one embodiment, the powdered metal is a mixture of stainless steel, brass and tungsten alloy. The stainless steel used in the present invention may be any 1 series carbon steels, 2 series nickel steels, 3 series nickel-chromium steels, 4 series molybdenum steels, series chromium steels, 6 series chromium-vanadium steels, 7 series tungsten steels, 8 series nickel-chromium-molybdenum steels, or 9 series silicon-manganese steels, e.g., 102, 174, 201, 202, 300, 302, 303, 304, 308, 309, 316, 316L, 316Ti, 321, 405, 408, 409, 410, 416, 420, 430, 439, 440, 446 or 601-665 grade stainless steel.

As known to those of ordinary skill in the art, stainless steel is an alloy of iron and at least one other component that imparts corrosion resistance. As such, in one embodiment, the stainless steel is an alloy of iron and at least one of chromium, nickel, silicon, molybdenum, or mixtures thereof. Examples of such alloys include, but are not limited to, an alloy containing about 1.5 to about 2.5 percent nickel, no more than about 0.5 percent molybdenum, no more than about 0.15 percent carbon, and the balance iron with a density ranging from about 7 g/cm$^3$ to about 8 g/cm$^3$; an alloy containing about 6 to about 8 percent nickel, no more than about 0.5 percent molybdenum, no more than about 0.15 percent carbon, and the balance iron with a density ranging from about 7 g/cm$^3$ to about 8 g/cm$^3$; an alloy containing about 0.5 to about 1 percent chromium, about 0.5 percent to about 1 percent nickel, no more than about 0.5 percent molybdenum, no more than about 0.2 percent carbon, and the balance iron with a density ranging from about 7 g/cm$^3$ to about 8 g/cm$^3$; an alloy containing about 2 to about 3 percent nickel, no more than about 0.5 percent molybdenum, about 0.3 to about 0.6 percent carbon, and the balance iron with a density ranging from about 7 g/cm$^3$ to about 8 g/cm$^3$; an alloy containing about 6 to about 8 percent nickel, no more than about 0.5 percent molybdenum, about 0.2 to about 0.5 percent carbon, and the balance iron with a density ranging from about 7 g/cm$^3$ to about 8 g/cm$^3$; an alloy containing about 1 to about 1.6 percent chromium, about 0.5 percent or less nickel, no more than about 0.5 percent molybdenum, about 0.9 to about 1.2 percent carbon, and the balance iron with a density ranging from about 7 g/cm$^3$ to about 8 g/cm$^3$; and combinations thereof.

Suitable tungsten alloys include an alloy containing about 2.5 to about 3.5 percent nickel, about 0.5 percent to about 2.5 percent copper or iron, and the balance tungsten with a density ranging from about 17.5 g/cm$^3$ to about 18.5 g/cm$^3$; about 3 to about 4 percent nickel, about 94 percent tungsten, and the balance copper or iron with a density ranging from about 17.5 g/cm$^3$ to about 18.5 g/cm$^3$; and mixtures thereof.

In addition, the binders may contain additives such as antioxidants, coupling agents, surfactants, elasticizing agents, dispersants, and lubricants as disclosed in U.S. Pat. No. 5,950,063, which is hereby incorporated by reference in its entirety. Suitable examples of antioxidants include, but are not limited to thermal stabilizers, metal deactivators, or combinations thereof. In one embodiment, the binder includes about 0.1 to about 2.5 percent by weight of the binder of an antioxidant. Coupling agents may include but are not limited to titanate, aluminate, silane, or combinations thereof. Typical levels range between 0.5 and 15% by weight of the binder.

Figure 11:
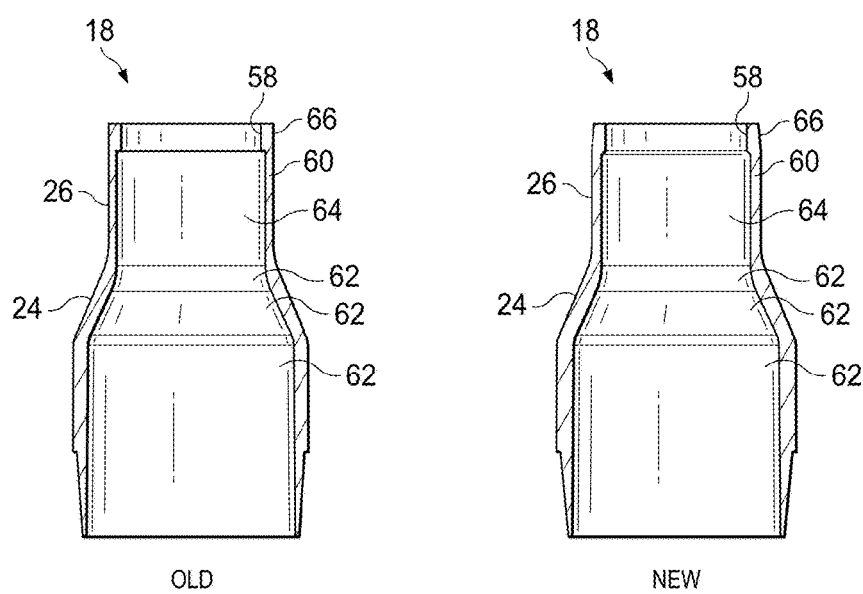
FIG. 11 depicts a view of the substantially cylindrical open-ended polymeric bullet-end having a shoulder forming chamber neck and a bullet.

FIG. 11 depicts a view of the substantially cylindrical open-ended polymeric bullet-end 18 has a shoulder 24 forming chamber neck 26 and a bullet (not shown). One embodiment includes modifications to strengthen the neck of the mouth 60 and to the internal base area 62 to reduce nose tearing and lodging in the chamber. The substantially cylindrical open-ended polymeric bullet-end 18 illustrates a lock 58 (e.g., 0.030×0.003) and added a step to allow for the lock 58 to flex out during firing. Polymer was added to the external area to strengthen the neck of the mouth 60 and to the internal base area 62. The interference of the bullet to the neck was increased by adding polymer to the inside of the neck 64 and the exit lock modified by adding an angle to the rim 66.

The polymeric and composite casing components may be injection molded. Polymeric materials for the bullet-end and middle body components must have propellant compatibility and resistance to gun cleaning solvents and grease, as well as resistance to chemical, biological and radiological agents. The polymeric materials must have a temperature resistance higher than the cook-off temperature of the propellant, typically about 320° F. The polymeric materials must have elongation-to-break values that to resist deformation under interior ballistic pressure as high as 60,000 psi in all environments (temperatures from about −65 to about 320° F. and humidity from 0 to 100% RH). According to one embodiment, the middle body component is either molded onto or snap-fit to the casing head-end component after which the bullet-end component is snap-fit or interference fit to the middle body component. The components may be formed from high-strength polymer, composite or ceramic.

Examples of suitable high strength polymers include composite polymer material including a tungsten metal powder, nylon 6/6, nylon 6, and glass fibers; and a specific gravity in a range of 3-10. The tungsten metal powder may be 50%-96% of a weight of the bullet body. The polymer material also includes about 0.5-15%, preferably about 1-12%, and most preferably about 2-9% by weight, of nylon 6/6, about 0.5-15%, preferably about 1-12%, and most preferably about 2-9% by weight, of nylon 6, and about 0.5-15%, preferably about 1-12%, and most preferably about 2-9% by weight, of glass fibers. It is most suitable that each of these ingredients be included in amounts less than 10% by weight. The cartridge casing body may be made of a modified ZYTEL resin, available from E.I. DuPont De Nemours Co., a modified 612 nylon resin, modified to increase elastic response.

Examples of suitable polymers include polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, or urethane hybrids. Examples of suitable polymers also include aliphatic or aromatic polyamide, polyeitherimide, polysulfone, polyphenylsulfone, poly-phenylene oxide, liquid crystalline polymer and polyketone. Examples of suitable composites include polymers such as polyphenylsulfone reinforced with between about 30 and about 70 weight percent, and preferably up to about 65 weight percent of one or more reinforcing materials selected from glass fiber, ceramic fiber, carbon fiber, mineral fillers, organo nanoclay, or carbon nanotube. Preferred reinforcing materials, such as chopped surface-treated E-glass fibers provide flow characteristics at the above-described loadings comparable to unfilled polymers to provide a desirable combination of strength and flow characteristics that permit the molding of head-end components. Composite components can be formed by machining or injection molding. Finally, the cartridge case must retain sufficient joint strength at cook-off temperatures. More specifically, polymers suitable for molding of the projectile-end component have one or more of the following properties: Yield or tensile strength at −65° F.>10,000 psi Elongation-to-break at −65° F.>15% Yield or tensile strength at 73° F.>8,000 psi Elongation-to-break at 73° F.>50% Yield or tensile strength at 320° F.>4,000 psi Elongation-to-break at 320° F.>80%. Polymers suitable for molding of the middle-body component have one or more of the following properties: Yield or tensile strength at −65° F.>10,000 psi Yield or tensile strength at 73° F.>8,000 psi Yield or tensile strength at 320° F.>4,000 psi.

Commercially available polymers suitable for use in the present invention thus include polyphenylsulfones; copolymers of polyphenylsulfones with polyether-sulfones or polysulfones; copolymers and blends of polyphenylsulfones with polysiloxanes; poly(etherimide-siloxane); copolymers and blends of polyetherimides and polysiloxanes, and blends of polyetherimides and poly(etherimide-siloxane) copolymers; and the like. Particularly preferred are polyphenylsulfones and their copolymers with poly-sulfones or polysiloxane that have high tensile strength and elongation-to-break to sustain the deformation under high interior ballistic pressure. Such polymers are commercially available, for example, RADEL R5800 polyphenylesulfone from Solvay Advanced Polymers. The polymer can be formulated with up to about 10 wt % of one or more additives selected from internal mold release agents, heat stabilizers, anti-static agents, colorants, impact modifiers and UV stabilizers.

The polymers of the present invention can also be used for conventional two-piece metal-plastic hybrid cartridge case designs and conventional shotgun shell designs. One example of such a design is an ammunition cartridge with a one-piece substantially cylindrical polymeric cartridge casing body with an open projectile-end and an end opposing the projectile-end with a male or female coupling element; and a cylindrical metal cartridge casing head-end component with an essentially closed base end with a primer hole opposite an open end having a coupling element that is a mate for the coupling element on the opposing end of the polymeric cartridge casing body joining the open end of the head-end component to the opposing end of the polymeric cartridge casing body. The high polymer ductility permits the casing to resist breakage.

One embodiment includes a 2 cavity prototype mold having an upper portion and a base portion for a 5.56 case having a metal insert over-molded with a Nylon 6 (polymer) based material. In this embodiment the polymer in the base includes a lip or flange to extract the case from the weapon. One 2-cavity prototype mold to produce the upper portion of the 5.56 case can be made using a stripper plate tool using an Osco hot spur and two subgates per cavity. Another embodiment includes a subsonic version, the difference from the standard and the subsonic version is the walls are thicker thus requiring less powder. This will decrease the velocity of the bullet thus creating a subsonic round.

The extracting inserts is used to give the polymer case a tough enough ridge and groove for the weapons extractor to grab and pull the case out the chamber of the gun. The extracting insert is made of 17-4 ss that is hardened to 42-45rc. The insert may be made of aluminum, brass, cooper, steel or even an engineered resin with enough tensile strength.

The insert is over molded in an injection molded process using a nano clay particle filled Nylon material. The inserts can be machined or stamped. In addition, an engineered resin able to withstand the demand on the insert allows injection molded and/or even transfer molded.

One of ordinary skill in the art will know that many propellant types and weights can be used to prepare workable ammunition and that such loads may be determined by a careful trial including initial low quantity loading of a given propellant and the well known stepwise increasing of a given propellant loading until a maximum acceptable load is achieved. Extreme care and caution is advised in evaluating new loads. The propellants available have various burn rates and must be carefully chosen so that a safe load is devised.

Figure 12:
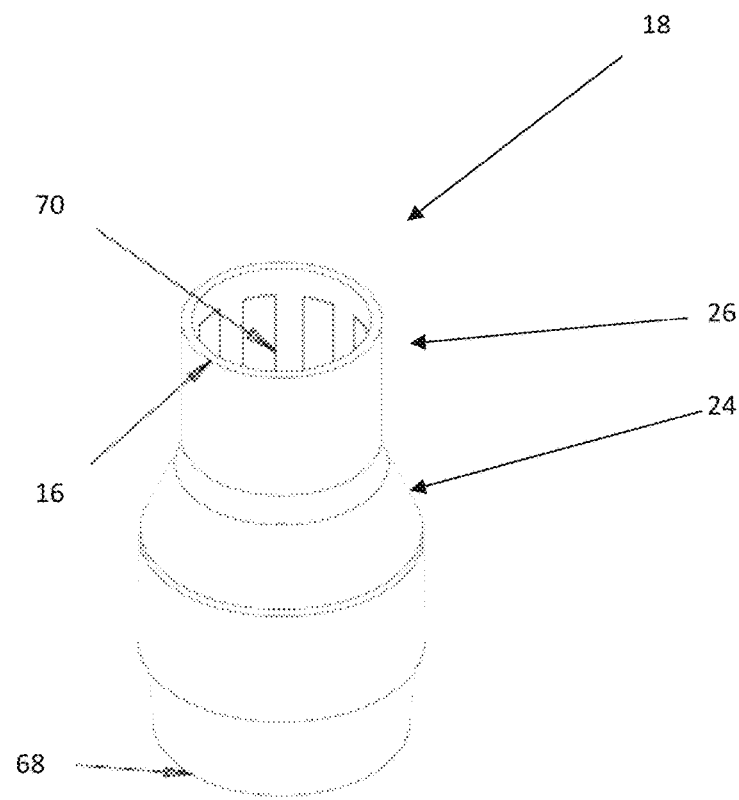
FIG. 12 depicts an elevation view of a bullet-end component of the polymeric cartridge casing.

FIG. 12 depicts an elevation view of a bullet-end component of the polymeric cartridge casing. A cartridge (not shown) suitable for use with high velocity rifles may be manufactured as a modular component system with a middle body component (not shown) with one end being connected to a bullet-end component 18 that is connected to a bullet (not shown) inserted therein and the other end being connected to a substantially cylindrical insert (not shown). As the cartridge (not shown) is made as a modular component system it must be assembled and fused together, e.g., the substantially cylindrical insert (not shown) must be attached to the middle body component (not shown) and the bullet-end component 18 must also be attached to the middle body component (not shown). In addition, the bullet (not shown) must be attached to the bullet-end component 18 at the forward end opening 16. The bullet-end component 18 has a shoulder 24 forming chamber neck 26 and a forward end opening 16 at one end to receive a bullet (not shown) and a powder chamber coupling 68 at the other that mates to the powder chamber (not shown). The forward end opening 16 may include a textured surface 70 that extends into the inner neck 64 to enhance the sealing of the bullet (not shown) and the bullet-end component 18. The textured surface 70 may be in the form of groves, slots, channels, scratches or any other texture to increase the surface area to enhance bonding of the bullet (not shown) and the bullet-end component 18. For example, the forward end opening 16 may include a textured surface 70 of channels that extend into the inner neck 64 to enhance the sealing of the bullet (not shown) and the bullet-end component 18. During assembly the textured surface 70 provides additional surface area for the adhesive to interact with and thus secure the seal between the bullet (not shown) and the forward end opening 16.

Figure 13:
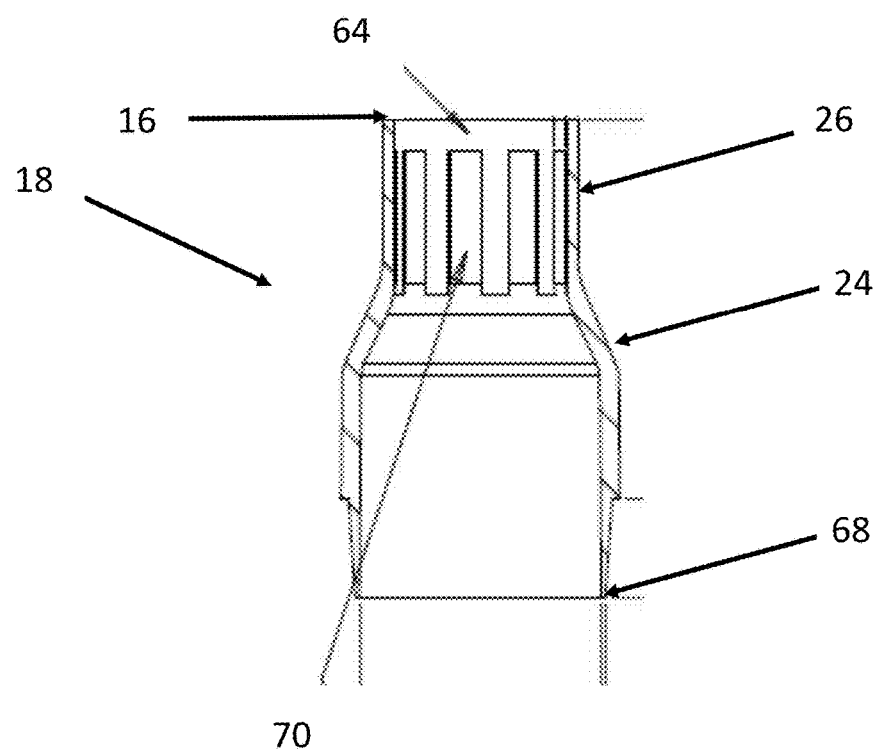
FIG. 13 depicts a side, cross-sectional view of a bullet-end component of the polymeric cartridge casing.

FIG. 13 depicts a side, cross-sectional view of a bullet-end component of the polymeric cartridge casing. A cartridge (not shown) suitable for use with high velocity rifles may be manufactured as a modular component system with a middle body component (not shown) with one end being connected to a bullet-end component 18 that is connected to a bullet (not shown) inserted therein and the other end being connected to a substantially cylindrical insert (not shown). The cartridge (not shown) is made as a modular component system it must be assembled and fused together, e.g., the substantially cylindrical insert (not shown) must be attached to the middle body component (not shown) and the bullet-end component 18 must also be attached to the middle body component (not shown). In addition, the bullet (not shown) must be attached to the bullet-end component 18 at the forward end opening 16. The bullet-end component 18 has a shoulder 24 forming chamber neck 26 and a forward end opening 16 at one end to receive a bullet (not shown) and a powder chamber coupling 68 at the other that mates to the powder chamber (not shown). The forward end opening 16 may include a textured surface 70 that extends into the inner neck 64 to enhance the sealing of the bullet (not shown) and the bullet-end component 18. The textured surface 70 may be in the form of groves, slots, channels, scratches or any other texture to increase the surface area to enhance bonding of the bullet (not shown) and the bullet-end component 18. For example, the forward end opening 16 may include a textured surface 70 of channels or grooves that extend into the inner neck 64 to enhance the sealing of the bullet (not shown) and the bullet-end component 18. During assembly the textured surface 70 provides additional surface area for the adhesive to interact with and thus secure the seal between the bullet (not shown) and the forward end opening 16. For example the textured surface 70 may be grooves that extend into the inner neck 64 so that an adhesive when applied to the bullet can wick into the grooves and into the inner neck 64 to provide a contact area on the bullet and the inner neck 64 for the adhesive. The adhesive can then be cured (e.g., UV light) and sealed. The textured surface 70 may be in any form that allows wicking and/or the increasing of the surface area, e.g., hatching, grooves, scratches, roughness, etc.

The components may be made of polymeric compositions, metals, ceramics, alloys, or combinations and mixtures thereof. In addition, the components may be mixed and matched with one or more components being made of different materials. For example, the middle body component (not shown) may be polymeric; the bullet-end component 18 may be polymeric; and a substantially cylindrical insert (not shown) may be metal. Similarly, the middle body component (not shown) may be polymeric; the bullet-end component 18 may be metal; and a substantially cylindrical insert (not shown) may be an alloy. The middle body component (not shown) may be polymeric; the bullet-end component 18 may be an alloy; and a substantially cylindrical insert (not shown) may be an alloy. The middle body component (not shown); the bullet-end component 18; and/or the substantially cylindrical insert may be made of a metal that is formed by a metal injection molding process.

The description of the preferred embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a substantially cylindrical insert by metal injection molding comprising the steps of:
    providing an injection mold of the substantially cylindrical insert, the insert mold comprising a top surface opposite a bottom surface and a substantially cylindrical coupling element that extends from the bottom surface, a primer recess in the top surface that extends toward the bottom surface, a primer flash hole aperture positioned in the primer recess to extend through the bottom surface, a groove in the primer recess around the primer flash hole aperture, and a flange that extends circumferentially about an outer edge of the top surface;
    providing a molding feedstock;
    injection molding the molding feedstock into the injection mold to form an substantially cylindrical insert having a first size; and
    removing the substantially cylindrical insert form the injection mold to form a finished substantially cylindrical insert.

2. The substantially cylindrical insert of claim 1, wherein the molding feedstock comprises a polymer, a stainless steel, a brass, or a ceramic alloy.

3. The substantially cylindrical insert of claim 1, wherein the molding feedstock comprises 102, 174, 201, 202, 300, 302, 303, 304, 308, 309, 316, 316L, 316Ti, 321, 405, 408, 409, 410, 415, 416, 416R, 420, 430, 439, 440, 446 or 601-665 grade stainless steel.

4. The metal injection molding substantially cylindrical insert of claim 3.

5. The substantially cylindrical insert of claim 1, wherein the finished substantially cylindrical insert is about 10 percent to about 20 percent smaller than the finished substantially cylindrical insert.

6. The metal injection molding substantially cylindrical insert of claim 5.

7. The metal injection molding substantially cylindrical insert made by the process of claim 1.

8. An ammunition cartridge comprising:
    a substantially cylindrical insert made by the process of injection molding comprising the steps of:
    providing an injection mold of the substantially cylindrical insert to form a substantially cylindrical insert wherein the substantially cylindrical insert mold comprises a top surface opposite a bottom surface and a substantially cylindrical coupling element that extends from the bottom surface, a primer recess in the top surface that extends toward the bottom surface, a primer flash hole aperture positioned in the primer recess to extend through the bottom surface, and a flange that extends circumferentially about an outer edge of the top surface;
    providing a feedstock for injection into the injection mold;
    injecting the feedstock into the injection mold to form an substantially cylindrical insert; and
    removing the finished substantially cylindrical insert from the injection mold;
    a substantially cylindrical polymeric middle body having a connection end and a second end that is molded over the substantially cylindrical insert and into the primer flash hole aperture;
    a nose comprising a bullet aperture for receiving a projectile, connected to a neck that extends to a shoulder that adapts to connect to the connection end,
    wherein a propellant chamber is formed between the bullet aperture and the primer flash hole aperture.

9. The ammunition cartridge of claim 8, wherein the substantially cylindrical polymeric middle body comprise a nylon polymer.

10. The ammunition cartridge of claim 8, wherein the nose is adhesively fitted to the substantially cylindrical polymeric middle body.

11. The ammunition cartridge of claim 8, wherein the nose is adhesively fitted to the substantially cylindrical polymeric middle body with a curable polymer adhesive.

12. The ammunition cartridge of claim 8, wherein the substantially cylindrical insert further comprises a coating to adjust the shrinkage.

13. The ammunition cartridge of claim 8, wherein the bullet aperture comprises a first and a second mechanical interlock for engagement of a bullet.

14. The ammunition cartridge of claim 8, wherein the bullet aperture comprises one or more cannelures formed on an inner circumferential surface of the forward opening end.

15. The ammunition cartridge of claim 8, wherein the bullet aperture comprises one, two, three, or more annular rings that mate with one, two, three, or more corresponding annular grooves positioned on a bullet.

16. The ammunition cartridge of claim 8, wherein a bullet is adhesively fitted to the forward opening end.

* * * * *